Jan. 17, 1939.   A. P. R. PORTE   2,144,081
TRANSPORTATION OF ROLLING LOADS
Filed Oct. 29, 1934
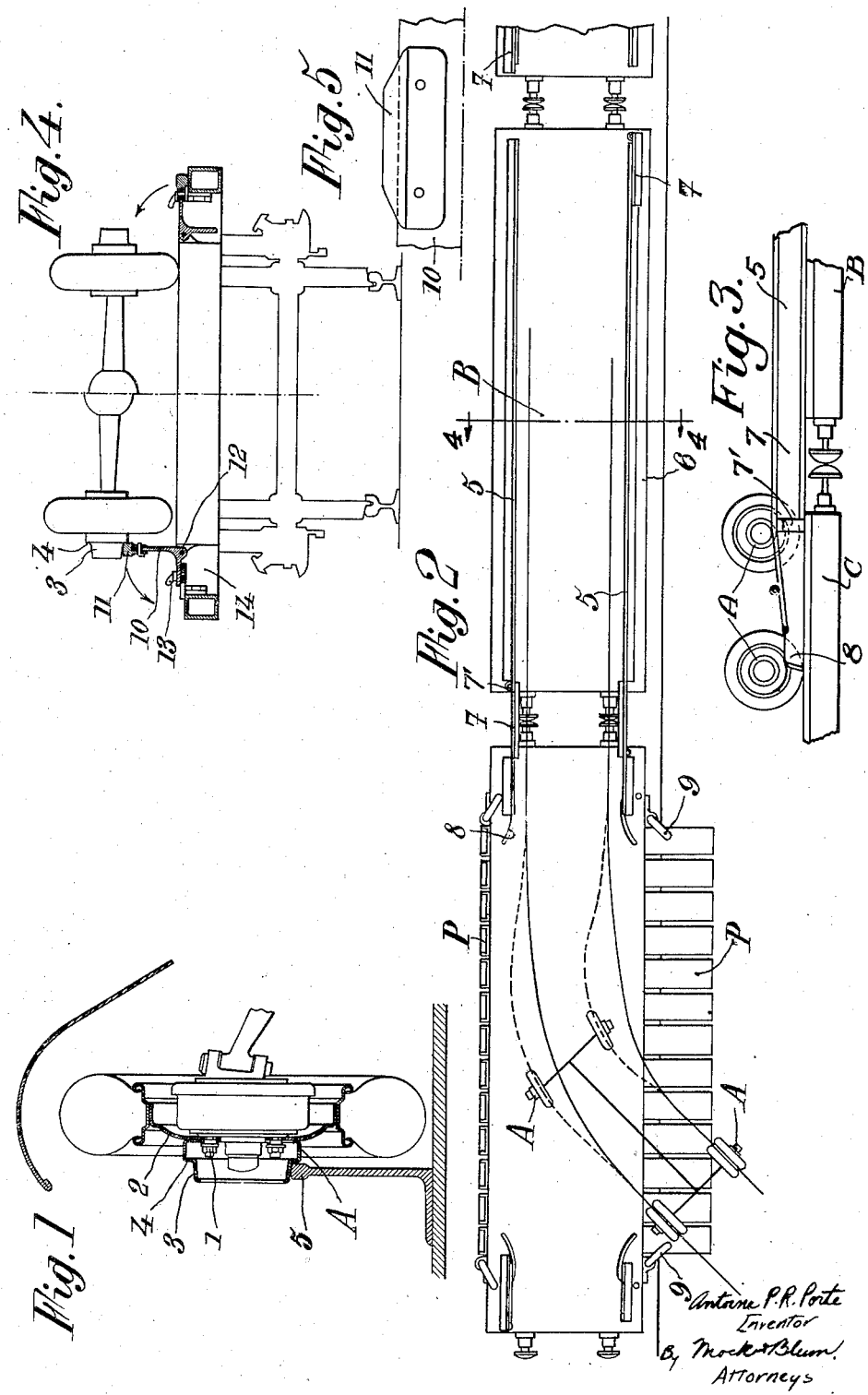

Patented Jan. 17, 1939

2,144,081

UNITED STATES PATENT OFFICE 2,144,081

TRANSPORTATION OF ROLLING LOADS

Antoine Paul René Porte, Les Ordonnieres, near Terte Imbault, France, assignor to "Société pour l'Union des Transports Ferroviaires et Routiers", Paris, France, a corporation of France Application October 29, 1934, Serial No. 750,497
In Belgium October 30, 1933

7 Claims. (Cl. 105—159)

The present invention relates to the transportation of rolling loads, and especially road vehicles (motor lorries or passenger motor cars) on railway trucks.

The object of the present invention is to provide devices permitting the easy and quick loading and unloading of these road vehicles and for securing said vehicles on the railway cars, in the transverse and in the longitudinal direction.

According to the present invention, the railway cars are provided with rails adapted to support the road vehicles to be carried by said railway cars, and the road vehicles are provided with rollers mounted on the axes of the wheels of said vehicles in such manner that said rollers may act, in cooperation with the above mentioned rails, like the usual wheels of railway vehicles, thus preventing, by means of their flanges, the transverse movement of the loads on the railway cars.

Other features of the present invention will result from the following detailed description of a specific embodiment thereof.

Preferred embodiments of the present invention will be hereinafter described, with reference to the accompanying drawing, given merely by way of example, and in which:

Fig. 1 is a partial vertical section of the wheel of an automobile vehicle and of the portion of the railway car on which it is loaded, according to the present invention;

Fig. 2 is a plan view of two railway cars (one of which is more especially intended to serve for the loading and unloading, while the other one serves to carry the automobile vehicle during transportation), made according to the present invention;

Fig. 3 is a partial side view of the cars shown in Fig. 2;

Fig. 4 is an end view, partly in section, of a railway car and the vehicle carried by it, the two halves of this figure illustrating different relative positions of the automobile vehicle with respect to the railway car;

Fig. 5 is a partial side view corresponding to Fig. 4.

According to the present invention, the loading and transportation of road vehicles on railway cars is effected by means of a device in which the road vehicles (automobile vehicles or trailers), instead of resting on the supporting railway cars on their own wheels, are carried by rails provided on said cars, by means of rollers mounted on the axles of the wheels of said road vehicles, said rollers coacting with said rails exactly in the same manner as ordinary railway car wheels with respect to the railroad track. In particular, the whole is so arranged that the rollers in question provide a perfect guide for the road vehicles on the railway cars in the course of the loading and unloading operations. During the transportation said rollers eliminate transverse shifting, owing to the provision of flanges on said rollers.

These rollers A may be fixed directly to the axles of the road vehicles, in which case it may be possible to remove the wheels from said vehicles during transportation. Or, alternately, as it will be supposed to be the case in the following description, rollers A are fixed to the wheels of these road vehicles, for instance to the webs of said wheels, especially in the case of stamped "Michelin" wheels.

Of course, these rollers may be connected either in a permanent or in a removable manner to the road vehicle.

In the embodiment shown in Fig. 1, roller A is fixed to the web of a wheel of the "Michelin" type by means of at least some of the bolts 1 that serve to fix the web 2 with the stud axle of the wheel. In this case roller A may be provided with an outer rim having holes made therein for the passage of the bolts 1 that hold the wheel, these rollers being then either hollow or solid. Alternately, as illustrated by Fig. 1, roller A is hollow and bolts 1 are inserted and fixed from the inside.

In any case, each roller A includes:

(a) On the one hand a cylindrical or conical portion 3 intended to run on said rails, this portion being made of suitable strength and preferably including a tire of special steel or any other suitable material, the diameter of this portion 3 being smaller than the diameter of the wheels proper of the road vehicle, for reasons that will be hereinafter explained;

(b) On the other hand a shoulder 4 acting as a flange and made of a sufficient height for efficiently opposing transverse shifting of the road vehicle with respect to the railway car.

Of course, the dimensions of the rollers in the direction of their axes will be suitably chosen, as a function on the one hand of the gauge, or track-width, of the system of rails provided on the supporting railway cars, and on the other hand of the gauge of the road vehicles. If it is desired to load vehicles of various gauges on railway cars, the carrier rails of which have a given gauge, it suffices to provide several kinds of rollers of different dimensions corresponding to vehicles of different gauges. When said rollers are such that they do not project too much from the sides of the respective wheels, they may be maintained on said wheels even during road transportation.

Referring to the carrier rails and the railway cars to be fitted with said rails, I may make use of cars B of the usual type, on the platform of which at least one pair of rails, such as 5 (Figs. 2 and 3) are secured, either in a permanent or in a removable manner. Said rails are located at a suitable distance from each other (a passage 6 being preferably provided on the outer sides of said rails so as to permit ready access to said vehicles).

If it is desired to transport, on the same railway cars, vehicle of substantially different gauges, the railway car is advantageously provided with at least two pairs of rails of different track-widths, the pair of rails of smaller track-width being, if necessary, adapted to be moved out of the way so as not to interfere with the displacements of the road vehicles that are to be supported by the outer pair of rails. For this purpose, the inner rails may, for instance, be pivotally mounted about their bases, according to an arrangement that will be hereinafter explained with reference to the so-called loading cars.

In order to load the road vehicles on the rails of the railway cars, I make use of means for moving these vehicles onto said cars in the longitudinal direction thereof, that is to say across the ends of these cars. These means consist of at least one loading car C, of the type described in my copending patent application, Ser. No. 646,229 filed on December 8, 1932. This loading car is connected to the end of a supporting car or at the end of a train of supporting cars and makes it possible to load the vehicles from a railway-platform parallel to the track on which the cars are located, this loading car being provided, on its longer sides, with panels P which are adapted to act as bridges.

In order to permit the passage of a vehicle, previously brought onto the loading car, as shown in Fig. 2, from said car to the adjacent supporting car B, I make use of movable rails 7, which may be pivotally mounted about a horizontal or vertical axis 7', which constitute a temporary connection between the loading car and the supporting car B, in line with rails 5; both of these rails (or groups of rails) being carried by one or the other of these two cars, or one rail being carried by the loading car and the other one by the supporting car.

The loading car is provided with guiding means whereby each road vehicle, after having been brought onto said car by rolling on its own wheels, has its rollers A correctly mounted on rails 7. These guiding means may consist, as shown by the drawing, of rail elements having inclined curved surfaces 8 converging toward the inlet end of said rail elements. The latter might be dispensed with, in which case members 8 would lead directly to rails 7.

In order to prevent any accident, removable guiding stops 9, which connect panels P to the floor of car C may be provided.

Finally, in order to permit the loading of a train of supporting cars, rails 7 of the type above described may be provided for connecting together the various supporting cars.

It may be desirable to be able to make use of loading cars C both as loading cars and as supporting cars. An arrangement to this effect is shown in Figs. 4 and 5. The rails 10 are so mounted as to make it possible to move them out of the way, so that the floor of the car is free for the loading operations. After a road vehicle has been brought into position onto the car, the rails are brought back into their working position, in which they are to coact with rollers A.

It is then necessary to lift the road vehicle so as to cause it to rest on rails 10 through its rollers A. For this purpose, rails 10, when they are in their working position, in which they are maintained by locking members 13, are of a height lower than that necessary for lifting the vehicle above the floor of the car, and rolling bands such as 11, carried by the top parts of the rails, and provided at their edges with inclined surfaces, serve to lift the vehicle so that the wheels thereof are no longer in contact with the floor of the car. These bands 11 may be fixed in suitable position on rails 10 and in this case the road vehicle is caused to roll on the top thereof through its rollers A, or bands 11 may be slidable along rails 10 and they are then brought under the rollers, thus lifting the vehicle.

Rails 10 may consist of ordinary L-shaped irons since they are not intended to be directly in contact with rollers A which rest on bands 11. These rails 10 are preferably pivotally mounted about a longitudinal axis 12, and when it is desired to bring them out of the way for loading operations they are moved into housings 14.

These bands may be adapted to support longitudinal securing means such as wedges, etc.

In the preceding description, it has been assumed that the road vehicles were brought onto the loading car by running on their own wheels. But said car might also be provided with curved rails carried by a movable member so that said rails may be moved into a position in which they rest on the railway platform at one of their ends, while at the other end, they are located opposite rails, such as 7, serving to connect cars B and C together. In this case the loading operation would be effected by causing the vehicle to run on its rollers A.

It has also been assumed that the supporting cars, or vehicle carriers, were cars of the usual type, including a floor. But the invention would be applicable with supporting cars consisting merely of a frame adapted to support the rails. In this case, said rails might be at a lower level on at least a portion of their length, whereby the vehicle, or vehicles, to be carried by each car would occupy a lower position with respect to the railway track, thus permitting to better utilize the master gauge of the track.

The system above described possesses many advantages, among which I may cite the following:

(a) It is possible to obtain a perfect guiding of the road vehicles, in the course of the loading and unloading operations, which is particularly interesting in the case of trailers;

(b) Small power is sufficient for displacing the vehicles during these operations;

(c) It is possible to obtain a very good transverse holding action, longitudinal holding being obtained through any suitable means, by acting for instance directly on rollers A. These longitudinal holding means cannot in any case have an injurious action on the pneumatic tires of the vehicle wheels, since the latter are entirely free;

(d) The cars and their equipment are extremely simple;

(e) The tendency to tilting of the vehicles that are transported on the cars is very much reduced, under the effect of shocks, because the plane in which these vehicles are capable of running is at a smaller distance from the center of gravity of the vehicles, so that the reactions transmitted to the suspension are greatly reduced;

(f) Finally, the connection between two adjacent cars is obtained by means of rails, this solution being much simpler than that which consists in making use of bridges.

Of course, the preceding explanations do not exclude the case in which the vehicles would be loaded from a railway-platform at right angles to the direction of the track.

As for the rails, they may obviously be made of assembled portions.

In a general manner, while I have, in the preceding description, endeavored to disclose what I deem to be practical and efficient embodiments of the present invention, it should be well understood that I do not wish to be limited thereto as there might be changes made in the arrangement, disposition and form of the parts as comprehended within the scope of the appended claims.

What I claim is:

1. A system for the transportation of wheeled road vehicles on railroads which comprises, in combination, a plurality of rollers supplemental to the wheels of said vehicle and provided on each road vehicle coaxially with the axles of said wheels, a supporting railway car, longitudinal rails on said railway car adapted to cooperate with said rollers for supporting said vehicles so that the wheels thereof do not rest on said railway car, a loading railway car adapted to be coupled with said supporting car in line therewith, rail elements in line with said rails extending between said supporting car and said loading car so as to bridge the space therebetween, and additional rail elements adapted to rest on the floor of said loading car disposed in line with said first mentioned rail elements, said second mentioned rail elements having inclined upper surfaces and curved ends for guiding said rollers and bringing them into engagement with said first mentioned rail elements, as said road vehicles are moved on their wheels along said loading car.

2. A system according to claim 1, and including guards disposed on either side of said second mentioned rail elements for preventing an accidental displacement of said vehicle.

3. A railway car for the transportation of another vehicle provided with rollers, which comprises, in combination, at least two longitudinal rails, movably supported on said car so that they can be fixed either in a position in which they do not project from the floor of said car or in an upraised position, means for locking said rails in the upraised position, and means carried by the ends of said rails adapted to engage said rollers for lifting said vehicle with respect to said car onto said rails, as said vehicle is moved on its wheels along said railway car.

4. In a system for the transportation of wheeled road vehicles on railroads, the combination of a plurality of rollers supplemental to the wheels of said road vehicles and attached to each road vehicle coaxially with the axles of said wheels, at least one supporting railway car having a platform, longitudinal rails arranged on the platform of said supporting railway car and adapted to cooperate with said rollers for supporting said vehicles with their wheels spaced from the platform of the railway car, a loading railway car provided with a platform and adapted to be coupled with said supporting railway car in line therewith, the platform of said loading railway car being in substantially the same level as the platform of said supporting railway car, and means adapted to connect the platform of said loading car with the rails of said supporting car, whereby said road vehicle can be transferred from said loading car onto the rails of said supporting car and can be lifted with respect to said car as said road vehicle is moved on its wheels along said loading car.

5. In a system for the transportation of wheeled road vehicles on railroads, the combination of vehicles having axles permanently supporting their wheels, at least one railway car provided with rails for supporting the vehicles, said rails being pivotally arranged on said railway car, means for locking said rails in an upraised position, the gauge of the upraised rails being larger than the gauge of said wheels, auxiliary rollers attached to said vehicles, and means carried by the ends of said rails adapted to engage said rollers for lifting said vehicles with respect to said car onto said rails, as said road vehicles are moved on their wheels along said railway car.

6. In a system for the transportation of wheeled road vehicles on railroads, the combination of a plurality of rollers supplemental to the wheels of said road vehicles and attached to the outside of each wheel of said road vehicles, at least one supporting railway car having a platform, longitudinal rails arranged on the platform of said supporting railway car and adapted to cooperate with said rollers for supporting said vehicles with the wheels spaced from the platform of the railway car, a loading structure provided with a platform, the platform of the loading structure being in substantially the same level as the platform of the supporting railway car, and means adapted to connect the platform of said loading structure with the rails of said supporting car, whereby said road vehicle can be transferred from said loading structure onto the rails of said supporting car and can be lifted with respect to said car, as said road vehicle is moved on its wheels along said loading structure.

7. In a system for the transportation of wheeled road vehicles on railroads, the combination of a plurality of rollers supplemental to the wheels of said road vehicles and attached to the outside of each wheel of said road vehicles, at least one supporting railway car having a platform, longitudinal rails arranged on the platform of said supporting railway car and adapted to cooperate with said rollers for supporting said vehicles with the wheels spaced from the platform of the railway car, a loading structure provided with a platform, the platform of the loading structure being in substantially the same level as the platform of the supporting railway car, and rail elements adapted to connect the platform of said loading structure with the rails of said supporting car, said rail elements being in line with said rails and extending between said supporting car and said loading structure so as to bridge the space therebetween, whereby said road vehicle can be transferred from said loading structure onto the rails of said supporting car and can be lifted with respect to said car, as said road vehicle is moved on its wheels along said loading structure.

ANTOINE PAUL RENÉ PORTE.